United States Patent
Kanekiyo et al.

(10) Patent No.: US 6,329,894 B1
(45) Date of Patent: Dec. 11, 2001

(54) THIN PLATE MAGNET HAVING MICROCRYSTALLINE STRUCTURE

(75) Inventors: Hirokazu Kanekiyo, Kyoto; Satoshi Hirosawa, Otsu, both of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/367,100
(22) PCT Filed: Jan. 28, 1998
(86) PCT No.: PCT/JP98/00331
  § 371 Date: Aug. 10, 1999
  § 102(e) Date: Aug. 10, 1999
(87) PCT Pub. No.: WO98/36428
  PCT Pub. Date: Aug. 20, 1998

(30) Foreign Application Priority Data

Feb. 14, 1997 (JP) .................................................. 9-039880
Mar. 10, 1997 (JP) .................................................. 9-074442

(51) Int. Cl.⁷ ........................................................ H01F 7/02
(52) U.S. Cl. ............................................ 335/302; 148/302
(58) Field of Search .................... 335/302–306; 148/101, 120, 302, 103, 104

(56) References Cited

U.S. PATENT DOCUMENTS

| | | | |
|---|---|---|---|
| 4,762,574 | * | 8/1988 | Ghandehari et al. ................. 148/103 |
| 4,765,848 | * | 8/1988 | Mohri et al. ......................... 148/302 |
| 4,770,702 | * | 9/1988 | Ishigaki et al. ........................ 75/244 |
| 4,773,950 | * | 9/1988 | Fujimura et al. ..................... 148/302 |
| 4,792,368 | * | 12/1988 | Sagawa et al. ....................... 148/302 |
| 4,840,684 | * | 6/1989 | Fujimura et al. ..................... 148/302 |
| 5,536,224 | * | 7/1996 | Kobayashi et al. .................. 148/101 |

* cited by examiner

Primary Examiner—Lincoln Donovan
Assistant Examiner—Tuyen T. Nguyen
(74) Attorney, Agent, or Firm—Dykema Gossett PLLC

(57) ABSTRACT

The purpose of the present invention is to present a thin-plate magnet with a fine crystalline structure that is 70 μm to 500 μm thick, making miniature, thin magnetic circuits possible, and has, as cast, an inherent coercive force iHc of 2.5 kOe or higher and residual magnetic flux density of 9 kG or higher and a performance-to-cost ratio rivaling that of hard ferrite magnets when Nd—Fe—B fine crystalline permanent magnets with a low rare earth content that are a mixture of a soft magnetic phase and a hard magnetic phase are produced. iHc can be increased to 2.5 kOe or higher and the optimum roll circumferential speed range within which hard magnetic properties are realized can be expanded when compared to the conditions under which Nd—Fe—B ternary magnets are produce, while at the same time, a fine crystalline permanent magnet alloy with a thickness of 70 μm to 500 μm is obtained, by using an alloy melt with a specific composition to which Co, Cr, Mn, Ni, Cu, Ga, Ag, Pt, Au, or Pb has been added during the process whereby a fine crystalline permanent magnet alloy having a fine crystalline structure of 15 nm to 50 nm is produced directly from an alloy melt by continuously casting the alloy melt on a cooling roller that is rotating in an inert gas atmosphere under reduced pressure of 30 kPa or less.

2 Claims, 2 Drawing Sheets

THIN PLATE MAGNET HAVING MICROCRYSTALLINE STRUCTURE

TECHNICAL FIELD

The present invention pertains to a thin-plate magnet that is ideal for various types of magnetic circuits used in small motors, actuators, magnetic sensors, etc. The present invention is characterized in that a magnet with a fine crystalline structure is obtained by the method whereby a melt of a specific composition comprising 6 at % or less of a rare earth element and 15 to 30 at % boron is continuously cast on a cooling roller that is rotating in a specific inert gas atmosphere under reduced pressure, with the crystalline structure as cast (in the cast state) being essentially 90% or more of a mixture of an $FE_3B$ compound, $\alpha$-Fe and a coexisting compound phase having an $Nd_2Fe_{14}B$ crystalline structure and the mean crystal grain diameter of each structural phase being 10 nm to 50 nm as cast (in the cast state). The present invention pertains to thin-plate magnets with magnetic properties of $iHc \geq 2.5$ kOe and $Br \geq 9$ kG and a fine crystalline structure with a thickness of 70 $\mu$m to 500 $\mu$m that are produced directly from an alloy melt.

BACKGROUND ART

Today home appliances, OA equipment, electrical fixtures, etc., that are even higher performance and smaller and lighter weight are in demand and designs for maximizing the performance-to-weight ratio of an entire magnetic circuit that uses permanent magnets are being studied. A permanent magnet with a residual magnetic flux density Br of 5 kG to 7 kG is ideal for direct-current motors with a brush attached, which account for more than half [of the motors] produced today, but these cannot be obtained by conventional hard ferrite magnets.

For instance, the abovementioned magnetic properties are satisfied with Nd—Fe—B sintered magnets and Nd—Fe—B bonded magnets that are mainly $Nd_2Fe_{14}B$. However, Nd—Fe—B magnets contain 10 to 15 at % Nd, which requires many processes and a large facility for separation and purification and reduction of the metal, and therefore, when compared to hard ferrite magnets, they are very expensive. Consequently, these magnets have been promoted as a substitute for hard ferrite magnets only in some types of equipment because of the performance-to-cost ratio. An inexpensive permanent magnet with a Br of 5 kG or higher has yet to be discovered.

Moreover, a thin-plate permanent magnet wherein thickness of the permanent magnet itself is 100 $\mu$m to 500 $\mu$m is needed in order to realize miniature and thin magnetic circuits. Since it is difficult to obtain a bulk material of 500 $\mu$m or less with Nd—Fe—B sintered magnets, thin-plate magnets can only be made by the method whereby sintered plates with a thickness of several mm are ground, or bulk material is sliced with a wire saw, etc., and therefore, there are problems in that finishing cost is high and the yield is low.

Nd—Fe—B bonded magnets are obtained by bonding powder with a thickness of approximately 30 $\mu$m and diameter of several 10 $\mu$m to 500 $\mu$m with resin and therefore, it is difficult to mold bonded magnets where the thin-plate thickness is 100 $\mu$m to 300 $\mu$m.

On the other hand, an Nd—Fe—B permanent magnet whose main phase is an $Fe_3B$ compound with an $Nd_4Fe_{77}B_{19}$ (at %) neighboring composition has recently been presented (R. Coehoorn et al., J. de Phys, C8, 1988, pages 669–670), and the details of this technology are disclosed in U.S. Pat. No. 4,935,074, etc.

Moreover, prior to this, Koon presented a method of producing permanent magnets consisting of fine crystals by performing crystallization heat treatment on an La—R—B—Fe amorphous alloy comprising La as the essential element in U.S. Pat. No. 4,402,770.

It recently has been reported that thin pieces with hard magnetic properties are obtained by spraying Nd—Fe—B—V—Si alloy melt containing 3.8 at % to 3.9 at % Nd onto a Cu roller that is rotating to make amorphous flakes and then heat treating these at 700° C., as disclosed in EP Patent Application 558691B1 by Richter et al. These permanent magnetic materials are obtained by crystallization heat treatment of amorphous flakes with a thickness of 20 $\mu$m to 60 $\mu$m and have a metastable structure with a crystal aggregate structure that is a mixture of an $Fe_3B$ phase with soft magnetism and an $R_2Fe_{14}B$ phase with hard magnetism.

The abovementioned permanent magnetic material has a Br of 10 kG and an iHc of 2 kOe~3 kOe and has a low content of Nd, which is expensive, of 4 at % and therefore, the starting material cost is less expensive than with Nd—Fe—B magnets whose main phase is $Nd_2Fe_{14}B$. However, there are limits to the liquid solidification conditions, which are essential to making an amorphous alloy from the starting mixture, and, at the same time, there are limits to the heat treatment conditions for obtaining a material with hard magnetism. Therefore, [such magnets] are impractical in terms of industrial production and as a result, there is a problem in that they cannot be inexpensively presented as a substitute for hard ferrite magnets. Moreover, said permanent magnet materials are obtained by crystallization heat treatment of amorphous flakes with a thickness of 20 $\mu$m to 60 $\mu$m, and therefore, permanent magnets having a thickness of 70 $\mu$m to 500 $\mu$m as required for thin-plate magnets cannot be obtained.

On the other hand, U.S. Pat. No. 508,266, etc., disclose the fact that rapidly Nd—Fe—B magnetic materials consisting of a structure consisting of crystals with hard magnetic properties are directly obtained by rapidly solidifying an alloy melt on a roller at a circumferential speed of 20 m/s. However, since flake thickness of the rapidly solidified alloy obtained under these conditions is thin at approximately 30 $\mu$m, they can be crushed to a powder particle diameter of 10 $\mu$m to 500 $\mu$m and used as the abovementioned bonded magnets, but they cannot be used for thin-plate magnets.

DISCLOSURE OF THE INVENTION

An object of the present invention is to solve the abovementioned problems with an Nd—Fe—B magnet comprising 6 at % or less of a rare earth element and having fine crystals, another object of the present invention is to obtain a magnet having an inherent coercive force iHc of 2.5 kOe or higher, residual magnetic flux density Br of 9 kG or higher, and a performance-to-cost ratio rivaling that of hard ferrite magnets by casting, and yet another object of the present invention is to present a thin-plate magnet that makes small, thin magnetic circuits possible by having a fine crystal structure that is 70 to 500 $\mu$m thick.

The inventors disclosed that a fine crystalline permanent magnet alloy with hard magnetic properties of $iHc \geq 2$ kOe and $Br \geq 10$ kG is directly obtained from an alloy melt by the production method whereby an alloy melt of a low-rare earth Nd—Fe—B ternary composition comprising 6 at % or less of Nd and 15 to 30 at % boron is continuously cast onto a cooling roller that is rotating at a roller circumferential speed of 2 m/s to 10 m/s in a specific inert gas atmosphere under reduced pressure. However, this method of producing an Nd—Fe—B ternary magnet has a problem in that the roller circumferential speed region within which hard magnetic properties are obtained is narrow. Furthermore, coercive force of only 2 kOe to 3 kOe is obtained with this Nd—Fe—B ternary magnet and therefore, thermal demagnetization is considerable, and it is necessary to raise the operating point of the magnet as much as possible in order to realize high magnetic flux density, leading to considerable limitation of the magnet shape and the environment in which it is used.

The inventors performed many tests of the problem points of methods of producing Nd—Fe—B fine crystal permanent magnets with low rare earths content that are mixtures of a soft magnetic phase and a hard magnetic phase. As a result, they discovered that the abovementioned problems can be solved by using an alloy melt to which specific elements have been added during the process previously presented by the inventors, whereby a fine crystalline permanent magnet alloy with a fine crystalline structure of 15 nm to 50 nm is directly obtained from an alloy melt by casting the alloy melt continuously onto a cooling roller that is rotating in a specific inert gas atmosphere under reduced pressure. That is, they completed the present invention upon discovering that the iHc of the magnet can be improved to 2.5 kOe or higher and the ideal roller circumferential speed range with which hard magnetic properties are obtained can be expanded in comparison to the conventional conditions for producing an Nd—Fe—B ternary magnet and at the same time, a fine crystalline permanent magnet alloy with a thickness of 70 μm to 500 μm is obtained by the method whereby an alloy melt to which a specific element has been added is used.

That is, the thin-plate magnet with a fine crystalline structure of the present invention is a permanent magnet with a thickness of 70 to 500 μm and magnetic properties of iHc≧2.5 kOe and Br≧9 kG consisting of fine crystals with an average crystal grain diameter of 15 nm to 50 nm, 90% of the crystalline structure of which, as cast (in a cast state), is $Fe_3B$ compound as well as α-Fe coexisting with a compound phase having an $Nd_2Fe_{14}B$ crystalline structure, an alloy represented by the composition formula

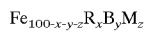

or

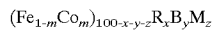

(Here, R is one or two or more of Pr, Nd, Tb, and Dy and M is one or two or more of Cr, Mn, Ni, Cu, Ga, Ag, Pt, Au, and Pb.) where the symbols x, y, z and m, which restrict the composition range, satisfy 1≦x<6 at %, 16<y≦20 at %, 0.01≦z≦7 at %, and 0.001≦m≦0.5, respectively.

BEST MODE FOR CARRYING OUT THE INVENTION

Figure 1:
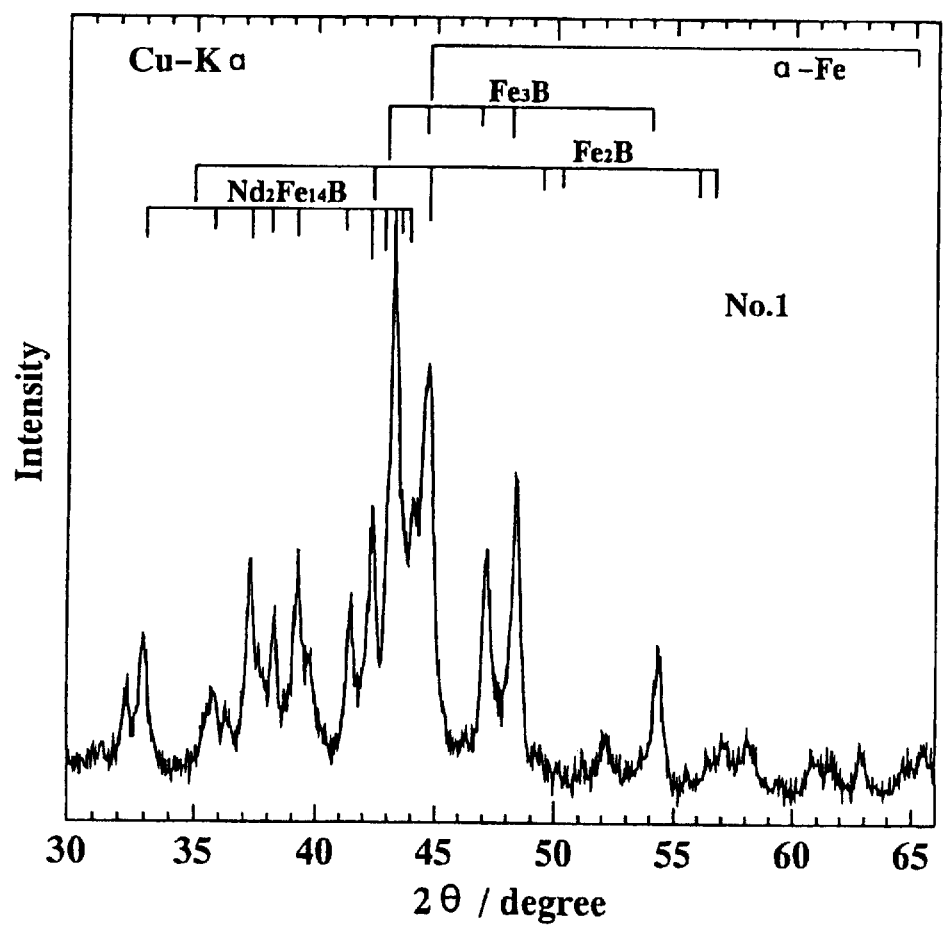
FIG. 1 is a graph showing the Cu—Kα characteristic X-ray diffraction pattern of the samples in the examples.

The alloy composition of the permanent magnet of the present invention is described in detail below:

High magnetic properties are obtained only when the permanent magnet contains a specific amount of 1 or 2 or more of Pr, Nd or Dy as rare earth element R, and an iHc of 2.5 kOe or higher will not be obtained with other rare earth elements such as Ce and La. With the exception of Tb and Dy, middle rare earth elements and heavy rare earth elements from Sm on are undesirable because they will have a detrimental effect on magnetic properties and because the magnet will be expensive.

If there is less than 1 at % R, an iHc of 2.5 kOe or greater will not be obtained and if there is 6 at % or more [of R], a Br of 9 kG or higher will not be obtained. Therefore, the amount of R is within a range of 1 at % or more to less than 6 at %. Ideally, [the amount of R] is 2 to 5.5 at %.

If there is 16 at % or more of B, there will be marked precipitation of the α-Fe in the metal structure after rapid solidification and precipitation of the compound with an $Nd_2Fe_{14}B$ crystalline structure, which is necessary for realization of coercive force, will be impeded. Therefore, an iHc that is only less than 1 kOe will be obtained. Moreover, if [the amount of B] exceeds 20 at %, there will be a marked reduction in squareness of the demagnetization curve and therefore, [the amount of B] should be within a range of more than 16 at % and 20 at % or less.

Fe accounts for the remainder of the abovementioned element content. A finer metal structure is obtained, squareness of the demagnetization curve, maximum energy product (BH)max, and heat resistance are improved, and the optimum roller circumferential speed range within which hard magnetic properties are realized can be expanded and rapid solidified conditions under which the abovementioned magnetic properties are obtained can be relaxed when the alloy melt is rapidly solidified on a rotating roller to produce a fine crystalline permanent magnet by substituting some of the Fe with Co. These results will not be obtained if the amount of Co substituted for Fe is less than 0.1%, while if it exceeds 50%, a Br of 9 kG or higher will not be obtained. Therefore, the amount of Co substituted for Fe is within a range of 0.1 to 50%. Ideally, it is 0.5 to 10%.

The Cr, Mn, Ni, Cu, Ga, Ag, Pt, Au, or Pb that is used as additional element M is one of the most important structural elements of the present invention. When the alloy melt is rapidly solidified on a rotating roller and a fine crystalline permanent magnet is made directly from the melt, the optimum roller circumferential speed range within which hard magnetic properties are obtained can be expanded and rapidly solidified conditions under which the abovementioned magnetic properties are obtained can be relaxed. Moreover, the additional element M participates in obtaining the fine structure of the fine crystalline permanent magnet and improves coercive force, as well as improves squareness of the demagnetization curve and increases Br and (BH) max. The above-mentioned effects are not obtained when the amount of added element M is less than 0.01 at %, while magnetic properties of Br≧9 kG are not obtained with 7 at % or more and therefore, the amount is within a range of 0.01 at % to 7 at %. Ideally, it is 0.06 at % to 5 at %.

The preferred conditions for making the permanent magnet of the present invention are described below:

By means of the present invention, a permanent magnet with a thickness of 70 μm to 500 μm and magnetic properties of iHc≧2.5 kOe and Br≧9 kG that is made from fine crystals with an average crystal grain diameter of 50 nm or smaller, 90% or more of which is a crystalline mixture of an $Fe_3B$ compound, α-Fe and a coexisting compound phase having an $Nd_2Fe_{14}B$ crystal structure, is directly obtained by continuously casting on a cooling roller rotating at a roller circumferential speed of 1 m/s to 10 m/s (average cooling speed of $3\times10^3$ to $1\times10^{5\circ}$ C./sec) in an inert gas atmosphere under reduced pressure of 30 kPa or less using an alloy melt with the above-mentioned composition.

Moreover, by means of the present invention, a cast alloy with a thickness of 70 μm to 500 μm is made from fine crystals whose average crystal grain diameter is 10 nm or smaller by continuously casting on a rotating cooling roller using the abovementioned alloy melt and then this is converted to a fine crystalline alloy with an average crystal grain diameter of 15 nm to 50 nm by performing heat treatment during crystal grain growth within a temperature range of 550 to 750° C. Thus, a thin-plate permanent magnet having magnetic properties of iHc≧2.5 kOe and Br≧9 kG can be obtained.

The most important part of the present invention is that the alloy melt with the above-mentioned specific composition is rapidly solidified by being continuously cast on a cooling roller that is rotating in an inert gas atmosphere under reduced pressure of 30 kPa or less in order to produce a thin-plate magnet with a crystalline structure, essentially 90% or more of which is a crystalline mixture of an $Fe_3B$ compound and a coexisting compound phase having an $Nd_2Fe_{14}B$ crystal structure and with the average crystal grain diameter of each phase being the 10 nm to 50 nm needed to obtain magnetic properties of iHc≧2.5 kOe and Br≧9 kG.

The specific pressure of the atmosphere when the alloy melt is continuously cast is a characteristic of the present invention. The reason for this restriction is that when the casting atmosphere exceeds 30 kPa, gas enters between the cooling roller and alloy melt and uniformity of the conditions for rapid solidification the cast alloy is lost, and as a result, a metal structure containing coarse α-Fe and magnetic properties of iHc≧2.5 kOe and Br≧9 kG cannot be obtained. Therefore, the alloy rapidly solidified atmosphere is kept at 30 kPa or less. A pressure of 10 kPa or less is ideal. The atmospheric gas is an inert gas in order to prevent oxidation of the alloy melt. An Ar atmosphere is ideal.

If the average particle diameter of the alloy that has been cast by the continuous casting method is not within 10 nm to 50 nm, which is the average crystal grain diameter needed to obtain magnetic properties of iHc≧2.5 kOe and Br≧9 kG, heat treatment can be performed for crystal growth as previously mentioned. The heat treatment temperature that provides the best magnetic properties depends on the composition. Grain growth will not occur, and therefore, average crystal grain diameter of 10 nm or larger will not be obtained, at a heat treatment temperature of less than 500° C. Moreover, if the heat treatment temperature exceeds 750° C., there will be marked grain growth and iHc, Br and squareness of the demagnetization curve will be detrimentally affected and the abovementioned magnetic properties will not be obtained. Therefore, the heat treatment temperature is limited to 500~750° C.

Heat treatment should be performed in an inert gas atmosphere, such as Ar gas, $N_2$ gas, etc., or in a vacuum at 1.33 Pa or lower, in order to prevent oxidation. Magnetic properties are not dependent on heat treatment time, but if the heat treatment time exceeds 6 hours, there will be a tendency toward a slight reduction in Br over time and therefore, the preferred heat treatment time is less than 6 hours.

Continuous casting with a cooling single roller or double roller can be used for casting of the alloy melt. If thickness of the cast alloy exceeds 500 μm, coarse α-Fe and $Fe_2B$ of several 100 nm precipitate and therefore, magnetic properties of iHc≧2.5 kOe and Br≧9 kG cannot be obtained. In addition, if thickness of the cast alloy is 70 μm or less, there will be a reduction in crystalline structure contained in the cast alloy and the amorphous phase will increase. As a result, crystallization of the amorphous phase by heat treatment becomes necessary. Furthermore, a rise in alloy temperature induced by the heat that is given off during crystallization of the amorphous phase will lead to grain growth of the crystalline structure that has already precipitated immediately after rapid solidification and therefore, a metal structure that is coarser than the metal structure with the average crystal grain diameter of 10 nm to 50 nm needed to obtain magnetic properties of iHc≧2.5 kOe and Br≧9 kG will be obtained and Br of 10 kG or higher will not be realized. Casting conditions are limited to performing rapid solidification in order to obtain a cast alloy with a thickness of 70 μm to 500 μm.

The material of the cooling roller used in continuous casting can be aluminum alloy, copper alloy, iron, carbon steel, tungsten, or bronze from the point of view of being heat conductable. Moreover, a cooling roller made from the above-mentioned materials whose surface has been plating with the same or a different material can be used. Copper alloy or carbon steel are particularly preferred for the cooling roller in terms of mechanical strength and economics. Since heat conductivity of materials other than the abovementioned is poor, the alloy melt cannot be sufficiently cooled and coarse α-Fe and $Fe_2B$ of several 100 nm will precipitate and as a result, magnetic properties of iHc≧2.5 kOe and Br≧9 kG cannot be obtained.

For instance, when a copper roller displaying surface roughness of a center line roughness Ra≦0.8 μm, maximum height Rmax≦3.2 μm, and mean roughness at 10 points Rz≦3.2 μm is used for the cooling roller, thickness of the cast alloy will be 70 μm or less and there will be a reduction in the crystalline structure contained in the cast alloy and an increase in the amorphous phase if the roller circumferential speed exceeds 10 m/s (average cooling speed of $1\times10^{5\circ}$ C.). Moreover, when the roller circumferential speed is 1.5 m/s or slower, thickness of the cast alloy will exceed 500 μm and therefore, coarse (Fe and $Fe_2B$ particles of several 100 nm will precipitate and magnetic properties of iHc≧2.5 kOe and Br≧9 kG will not be obtained. Consequently, roller circumferential speed of the copper roller is limited to 1.5 m/x to 10 m/s. Ideally, it is 2 m/s to 6 m/s.

Moreover, when an iron roller with the same surface roughness as the abovementioned copper roller is used as the cooling roller, compatibility between the alloy melt and cooling roller is better with the iron roller than the copper roller and therefore, thickness of the cast alloy is 70 μm or less and there is a reduction in crystalline structure and an increase in the amorphous phase contained in the cast alloy if the roller circumferential speed excess 7 m/s. When the roller circumferential speed is 1 m/s (average cooling speed of $3\times10^{3\circ}$ C./sec) or slower, thickness of the cast film will exceed 500 μm and therefore, coarse α-Fe and $Fe_2B$ of several 100 nm will precipitate and magnetic properties of iHc≧2.5 kOe and Br≧9 kG will not be obtained. Consequently, the roller circumferential speed of an iron roller is limited to 1 m/s to 7 m/s. Ideally, it is 1.5 m/s to 5.5 m/s.

Furthermore, when double roller rapid solidification is performed by cooling the alloy melt with the abovementioned two cooling iron rollers facing each other, the alloy thickness is determined by the distance between the rollers.

If the distance between the two rollers is 0.5 mm or more, the melt passing between the rolls will not come into contact with the cooling rollers and will not be cooled and as a result, a metal structure comprising coarse α-Fe will be obtained. If roller distance is 0.005 nm or less, the melt will flow out from between the rollers and casting cannot be continuously performed. Therefore, the distance between the two rollers is set at 0.005 mm to 0.5 mm. Ideally, it is 0.05 mm to 0.2 mm.

Moreover, if the roller circumferential speed of the two iron rolls exceeds 8 m/s, there will be a reduction in the crystalline structure and an increase in the amorphous phase comprising the cast alloy. If the roller circumferential speed is under 1 m/s, coarse α-Fe and $Fe_2B$ of several 100 nm will precipitate and therefore, magnetic properties of iHc≧2.5 kOe and Br≧9 kG will not be obtained. Consequently, roller circumferential speed is limited to 1 m/s to 8 m/s. Ideally, it is 1.5 m/s to 5 m/s.

The method whereby etching, ultrasonic processing, etc., is performed on a thin metal plate made by drawing can be used as the method of molding the continuous, (long) thin-plate magnet that has been obtained by continuous casting. Ultrasound-based stamping process is particularly preferred because the magnet can be worked into the desired shape without cracking the thin-plate magnet.

The crystalline phase of the fine crystalline permanent magnet alloy of the present invention is characterized in that it is made from a fine crystal aggregate where $Fe_3B$ compound with soft magnetism and α-Fe coexist with a hard magnetic compound phase having an $Nd_2Fe_{14}B$ crystal structure, with each of the structural phases having a mean crystal grain diameter within a range of 15 nm to 50 nm. If the mean crystal grain diameter comprising the fine crystalline permanent magnet alloy exceeds 50 nm, squareness of the demagnetization curve and Br will become worse and magnetic properties of Br≧9 kG will not be obtained. Therefore, a finer crystal grain diameter is preferred. However, if the average crystal grain diameter is under 15 nm, this will cause iHc to drop and therefore, the minimum crystal grain diameter is set at 15 nm.

Moreover, the thin-plate magnet obtained by the present invention has a thickness of 70 μm to 500 μm and its surface has a smoothness of a center line roughness Ra≦5 μm, maximum height≦20 μm, and average roughness at 10 points Rz≦10 μm.

Embodiments

EXAMPLE 1

The metals of Fe, Co, Cr, Mn, Ni, Cu, Ga, Ag, Hf, Ta, W, Pt, Au, Pb, B, Nd, Pr, Dy, and Tb with a purity of 99.5% or higher were weighed out to a total of 30 g in order to obtain compositions No. 1 through No. 9 in Table 1-1. The starting materials were introduced to a quartz crucible with a 0.3 mm×8 mm slit in the base and melted by induction heating in an Ar atmosphere kept at the quenching environment pressure listed in Table 1. Once the melting temperature reached 1,300° C., the melt surface was pressurized with Ar gas and melt was continuously cast from a height of 0.7 mm around the outside of a Cu cooling roller rotating at the roller circumferential speed listed in Table 1-2 to obtain a continuous, thin-plate quenched alloy with a width of 8 mm.

As shown by the X-ray diffraction pattern with Cu—Kα characteristic X-rays of Example No. 5 in FIG. 1, the thin-plate magnet that was obtained was confirmed to be a metal structure of an $Fe_3B$ compound and α-Fe coexisting with a compound phase having an $Nd_2Fe_{14}B$ crystal structure. Moreover, with respect to crystal grain diameter, all of the samples other than No. 8 were a fine crystalline structure with an average crystal grain diameter of 15 nm to 50 nm.

The magnetic properties of the thin-plate magnet that was obtained were determined by VSM measurement method after magnetization in a 60 kOe pulse magnetizing field using thin-plate magnets of a specific shape that had been stamped into discs with a diameter of 5 mm using an ultrasound stamping device. Table 2 shows the magnetic properties and average crystal grain diameter. Furthermore, part of the Fe in each structural phase of thin-plate magnets No. 1 through No. 9 was substituted with the elements of Co, Cr, Mn, Ni, Cu, Ga, Ag, Pt, Au and Pb.

Figure 2:
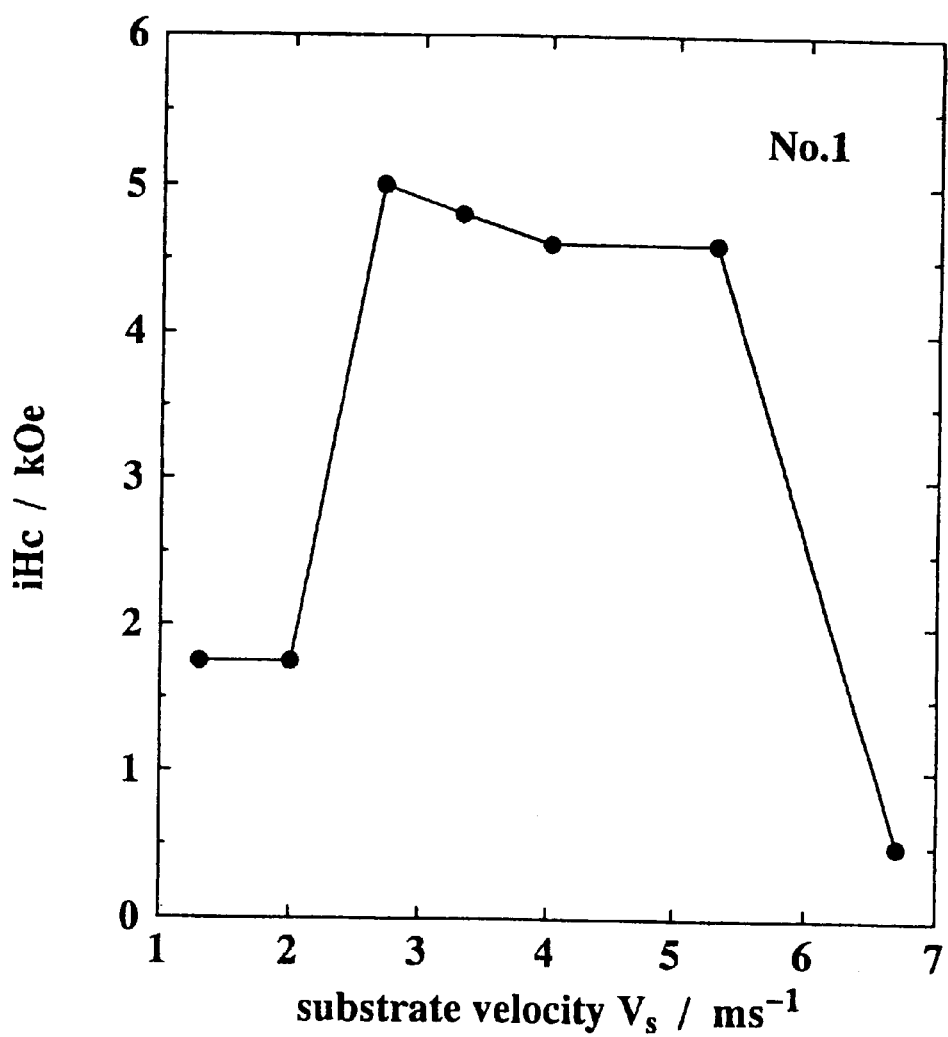
FIG. 2 is a graph showing dependency of coercive force by roller circumferential speed with rapid solidification using a rotating roller in the examples.

As shown by the dependency of coercive force on roller circumferential speed of Example No. 5 in FIG. 2, the magnetic properties of rapidly solidified alloys obtained by the present invention clearly depend on roller circumferential speed during rapid solidification. The roller circumferential speed range during rapid solidification within which an iHc of 2.5 kOe or higher is obtained is shown in Table 3 for the alloy compositions of Examples No. 1, No. 4 and No. 5.

EXAMPLE 2

Since the average crystal grain diameter in No. 8 of Table 1-1 was less than 10 nm, the rapidly solidified alloy was kept in Ar gas at 670° C. for 10 minutes and heat treated in order to bring the average crystal grain diameter to 10 nm or larger. The magnetic properties were measured by VSM using a thin-plate magnet that had been finished to a specific shape as in Example 1. The results are shown in Table 2.

Comparison 1

Continuous cast alloys with a width of 8 mm were made by the same process as in Example 1 using Fe, B, R and Co with a purity of 99.5% that had been brought to the compositions shown by No. 10 and No. 11 in Table 1-1 as in Example 1. The structural phases of the samples that were obtained were analyzed by Cu—Kα characteristic X-ray diffraction analysis and as a result, sample No. 10 was a metal structure consisting of $Nd_2Fe_{14}B$ with hard magnetism and $Fe_3B$ and α-Fe with soft magnetism. Moreover, a trace of $Nd_2Fe_{14}B$ was confirmed, but there was almost no $Fe_3B$ confirmed in sample No. 11. The magnetic properties measured by VSM of No. 10 and No. 11 are shown in Table 2.

As is clear from dependency of coercive force on roller circumferential speed in FIG. 2, the magnetic properties of Comparison No. 10 were dependent on roller circumferential speed during rapid solidification. The roller circumferential speed range within which coercive force of the sample in question, which is an Nd—Fe—B ternary system, can be realized, is narrow in comparison to Example No. 1, which contains Co and Cr. The roller circumferential speed range during rapid solidification of the alloy composition of Comparison No. 10 within which an iHc of 2.5 kOe or higher can be obtained is shown in Table 3.

TABLE 1-1

| | | Composition (at %) | | | |
| --- | --- | --- | --- | --- | --- |
| | | $Fe_{1-m}Co_m$ | A | R | M |
| Embodiment | 1 | Fe74 | B18.5 | Nd4.5 | Cr3 |
| | 2 | Fe76 | B18.5 | Nd3.5 + Dy1 | Mn1 |
| | 3 | Fe76 | B15 + C3 | Nd4.5 | Ni1.5 |
| | 4 | Fe70 + Co5 | B15 + C5 | Nd2.5 + Pr1 | Cu1.5 |
| | 5 | Fe73 + Co3 | B18.5 | Nd3.5 + Pr1 | Ga1 |

TABLE 1-1-continued

|  |  | Composition (at %) | | | |
|---|---|---|---|---|---|
|  |  | $Fe_{1-m}Co_m$ | A | R | M |
|  | 6 | Fe76.5 | B18.5 | Nd4 | Ag1 |
|  | 7 | Fe75 + Co3 | B18 | Nd3.5 | Pt0.5 |
|  | 8 | Fe75 + Co3 | B18 | Nd4.5 | Au0.5 |
|  | 9 | Fe73 + Co3 | B18.5 | Nd4 + Tb0.5 | Pb1 |
| Comparison | 10 | Fe77.5 | B18.5 | Nd4 | — |
|  | 11 | Fe66.0 | B18.5 | Nd5.5 | Cr10 |

TABLE 1-2

|  |  | Roller Circumferential Speed m/sec | Rapid Solidification Atmosphere Pressure kPa | Casting Alloy Thickness μm |
|---|---|---|---|---|
| Embodiment | 1 | 3.5 | 10 | 250 |
|  | 2 | 3.0 | 10 | 280 |
|  | 3 | 4.0 | 20 | 210 |
|  | 4 | 2.5 | 20 | 300 |
|  | 5 | 4.0 | 20 | 180 |
|  | 6 | 3.5 | 20 | 240 |
|  | 7 | 4.0 | 25 | 210 |
|  | 8 | 4.0 | 25 | 220 |
|  | 9 | 6.5 | 30 | 80 |
| Comparison | 10 | 5.0 | 1.3 | 200 |
|  | 11 | 3.0 | 1.3 | 280 |

TABLE 2

|  |  | Magnetic Properties | | | Mean Crystalline Grain |
|---|---|---|---|---|---|
|  |  | Br (kG) | iHe (kOe) | (BH)max (MGOe) | Diameter (nm) |
| Embodiment | 1 | 10.5 | 5.5 | 13.9 | 20 |
|  | 2 | 10.3 | 5.2 | 13.4 | 20 |
|  | 3 | 11.8 | 4.3 | 13.9 | 20 |
|  | 4 | 13.0 | 3.3 | 17.5 | 20 |
|  | 5 | 11.9 | 4.5 | 17.0 | 20 |
|  | 6 | 12.4 | 3.5 | 17.2 | 20 |
|  | 7 | 12.9 | 3.2 | 17.6 | 20 |
|  | 8 | 12.1 | 4.1 | 17.2 | 20 |
|  | 9 | 11.5 | 5.2 | 16.5 | 20 |
| Comparison | 10 | 12.3 | 3.3 | 14.9 | 50 |
|  | 11 | 4.7 | 12.4 | 6.7 | 40 |

TABLE 3

|  |  | Roller Circumference Speed (m/s) |
|---|---|---|
| Embodiment | 1 | 2.0~6.0 |
|  | 4 | 2.0~4.0 |
|  | 5 | 3.0~5.0 |
| Comparison | 12 | 4.2~5.4 |

Industrial Applicability

By means of the present invention, coercive force of magnets can be improved and magnetic properties of iHc≧2.5 kOe and Br≧9 kG can be obtained by adding Co, Cr, Mn, Ni, Cu, Ga, Ag, Pt, Au or Pb to the alloy melt when alloy melt is continuously cast onto a cooling roller that is rotating in a specific inert gas atmosphere under reduced pressure and fine crystalline permanent magnets with a fine crystalline structure of 15 nm to 50 nm are made directly from the alloy melt in order to obtain Nd—Fe—B fine crystalline permanent magnets with a low rare earth content that are a mixture of a soft magnetic phase and a hard magnetic phase. Moreover, at the same time, the optimum roller circumferential speed range within which hard magnetic properties are obtained is expanded when compared to conventional Nd—Fe—B ternary systems and the conditions under which fine crystalline permanent magnets with a thickness of 70 μm to 500 μm are made are relaxed so that stable industrial production at a low cost is possible. The present invention makes it possible to inexpensively provide thin-plate magnets with a thickness of 70 μm to 500 μm, which cannot be inexpensively mass-produced industrially by conventional methods, at a performance-to-cost ratio rivaling that of hard ferrite magnets, and these thin-plate magnets in turn make miniature, thin magnetic circuits possible.

What is claimed is:

1. A thin plate magnet comprising a primary mixture of $Fe_3B$, α-Fe, and a coexisting compound phase having an $Nd_2Fe_{14}B$ crystal structure and a composition formula selected from the group of $Fe_{100-x-y-z}R_xB_yM_z$, $(Fe_{1-m}Co_m)_{100-x-y-z}R_xB_yM_z$, and mixtures thereof, wherein R is an element selected from the group consisting of Pr, Nd, Tb, Dy and mixtures thereof; wherein M is an element selected from the group consisting of Cr, Mn, Cu, Ga, Ag, Pt, Au, Pb, andmixtures thereof; wherein said x,y, and z indicate the relative proportions of the respective R, B, and M such that 1 at %≦x<6 at %, 16 at %≦y≦20 at %, 0.01≦z≦7 at %, and 0.001≦m≦0.5, said magnet having a value for iHc of greater than about 2.5 kOe and a value for Br greater than about 9 kG, wherein said primary mixture comprises at least about 90% by volume of said magnet, and wherein said magnet comprises a casting having a fine crystal structure and a thickness of between about 70 μm and about 500 μm.

2. A magnet comprising a thin magnet plate of a fine crystal structure having a thickness of about 70 to about 500 μm and magnetic properties of iHc≧2.5 kOe and Br≧9kG, at least 90 volume percent of which consisting of a mixture of $Fe_3B$ compound, α-Fe and a coexisting compound phase having an $Nd_2Fe_{14}B$ crystalline structure, and which is represented by the compositionformula $Fe_{100-x-y-z}R_xB_yM_z$ or $(Fe_{1-m}Co_m)_{100-x-y-z}R_xB_yM_z$ wherein R is at least one type selected from the groups consisting of Cr, Mn, Cu, Ga, Ag, Pt, Au and Pb; and the symbols x,y,z and m satisfy respectively 1≦x<6 at %, 16≦y≦20 at %, 0.01≦z≦7 at % and 0.001≦m≦0.05.

* * * * *